United States Patent
Kawakami et al.

(10) Patent No.: US 8,728,653 B2
(45) Date of Patent: May 20, 2014

(54) POWER STORAGE DEVICE

(75) Inventors: Takahiro Kawakami, Kanagawa (JP); Nadine Takahashi, Kanagawa (JP); Masaki Yamakaji, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/045,667

(22) Filed: Mar. 11, 2011

(65) Prior Publication Data

US 2011/0229757 A1   Sep. 22, 2011

(30) Foreign Application Priority Data

Mar. 19, 2010   (JP) ................................ 2010-064427

(51) Int. Cl.
*H01M 4/131*   (2010.01)

(52) U.S. Cl.
USPC .......................................................... 429/178

(58) Field of Classification Search
None
See application file for complete search history.

(56) References Cited

U.S. PATENT DOCUMENTS

| | | | |
|---|---|---|---|
| 5,834,139 A | | 11/1998 | Shodai et al. |
| 7,393,476 B2 | | 7/2008 | Shiozaki et al. |
| 2004/0234857 A1 | | 11/2004 | Shiozaki et al. |
| 2006/0121352 A1* | | 6/2006 | Kejha et al. .................. 429/232 |
| 2007/0026315 A1* | | 2/2007 | Lampe-Onnerud et al. .. 429/224 |
| 2007/0160906 A1 | | 7/2007 | Tooyama et al. |
| 2007/0212609 A1 | | 9/2007 | Iwami |
| 2009/0087731 A1* | | 4/2009 | Fukui et al. .................. 429/164 |
| 2009/0123813 A1* | | 5/2009 | Chiang et al. ................ 429/50 |
| 2009/0220862 A1 | | 9/2009 | Toyama et al. |
| 2010/0233542 A1 | | 9/2010 | Endo et al. |

FOREIGN PATENT DOCUMENTS

| | | |
|---|---|---|
| EP | 1 447 866 A1 | 8/2004 |
| JP | 09-035714 | 2/1997 |
| JP | 2007-184145 | 7/2007 |
| JP | 2007-250198 | 9/2007 |
| JP | 2008-166156 | 7/2008 |
| JP | 2009-123400 | 6/2009 |
| JP | 2009-206047 | 9/2009 |
| WO | WO 03/044881 A1 | 5/2003 |

OTHER PUBLICATIONS

International Search Report (Application No. PCT/JP2011/053678; PCT13326) Dated Apr. 26, 2011.
Written Opinion (Application No. PCT/JP2011/053878; PCT13326) Dated Apr. 26, 2011.
Thackeray, et al., "$Li_2MnO_3$—stabilized $LiMO_2$ (M=Mn, Ni, Co) electrodes for lithium-ion batteries", Journal of Materials Chemistry, vol. 17, Publication Date Apr. 20, 2007, pp. 3112-3125.

\* cited by examiner

*Primary Examiner* — Patrick Ryan
*Assistant Examiner* — Wyatt McConnell
(74) *Attorney, Agent, or Firm* — Nixon Peabody LLP; Jeffrey L. Costellia

(57) ABSTRACT

An object is to increase the amount of ions capable of entering and leaving a positive electrode active material in an ion battery so that the capacity of the battery is increased. When a solid solution including alkali metal oxide having electrical conductivity less than or equal to $10^{-10}$ S/cm and including alkali metal with a valence of 2 or more, and alkali metal oxide having electrical conductivity greater than or equal to $1\times10^{-6}$ S/cm and less than or equal to $3\times10^{-6}$ S/cm is used as a positive electrode active material in an ion battery, the amount of ions capable of entering and leaving the positive electrode active material is increased, so that the capacity of the battery is increased.

12 Claims, 4 Drawing Sheets

POWER STORAGE DEVICE

TECHNICAL FIELD

The present invention relates to a power storage device and an embodiment of the disclosed invention relates to the structure of a positive electrode of the power storage device.

BACKGROUND ART

In recent years, with an increase of consciousness about environmental engineering, development of power generation devices using a power generation method which poses fewer burdens on the environment (e.g., solar power generation device) than power generation devices using conventional power generation methods has been actively conducted. Along with development of power generation devices, power storage devices have also been developed.

As a power storage device, a secondary battery such as a lithium ion secondary battery (alternatively called a lithium ion storage battery or simply a lithium ion battery) can be given as example (see Patent Document 1). Lithium ion secondary batteries have high energy density and are widely popular because they are suited for miniaturization.

In a lithium ion secondary battery, lithium metal oxide is used for a positive electrode and a carbon material such as graphite is used for a negative electrode. As a positive electrode active material of a lithium ion secondary battery, for example, a positive electrode active material including composite oxide containing at least alkali metal and transition metal can be given.

In a lithium ion battery, at the time of charging, lithium in a positive electrode material is ionized into a lithium ion and moved into a carbon material of a negative electrode material through an electrolyte solution. Generally, when the percentage of a material which ions can enter and leave is increased in an active material with the volume of the active material unchanged, the amount of ions capable of entering and leaving the active material is increased, which can lead to an increase in capacity of a battery.

[Reference]

[Patent Document]

[Patent Document 1] Japanese Published Patent Application No. H09-035714

DISCLOSURE OF INVENTION

An object of an embodiment of the present invention is to increase the amount of ions capable of entering and leaving a positive electrode active material so that the capacity of a battery is increased.

According to an embodiment of the present invention, a solid solution including a material having electrical conductivity less than or equal to $10^{-10}$ S/cm and a material having electrical conductivity greater than or equal to $1 \times 10^{-6}$ S/cm and less than or equal to $3 \times 10^{-6}$ S/cm is used for a positive electrode.

According to an embodiment of the present invention, a solid solution including lithium metal oxide having electrical conductivity less than or equal to $10^{-10}$ S/cm and lithium metal oxide having electrical conductivity greater than or equal to $1 \times 10^{-6}$ S/cm and less than or equal to $3 \times 10^{-6}$ S/cm is used for a positive electrode.

According to an embodiment of the present invention, a solid solution including lithium metal oxide having electrical conductivity less than or equal to $10^{-10}$ S/cm and including lithium with a valence of 2 or more, and lithium metal oxide having electrical conductivity greater than or equal to $1 \times 10^{-6}$ S/cm and less than or equal to $3 \times 10^{-6}$ S/cm is used for a positive electrode.

According to an embodiment of the present invention, the solid solution has electrical conductivity greater than or equal to $1 \times 10^{-7}$ S/cm and less than or equal to $10 \times 10^{-7}$ S/cm.

When a solid solution including a material with high electrical conductivity and a material with low electrical conductivity is used as a positive electrode active material, the amount of ions capable of entering and leaving the positive electrode active material can be increased as compared to that in the case where either of the material with high electrical conductivity and the material with low electrical conductivity is singly used. Accordingly, the capacity of a battery can be increased.

In addition, according to an embodiment of the present invention, alkali metal oxide, which could not be used as a positive electrode material because alkali metal is contained therein but is less likely to be ionized, can be used as a positive electrode material. Thus, an ion battery can be manufactured using alkali metal oxide, which is excellent in terms of safety and cost but could not be used.

BEST MODE FOR CARRYING OUT THE INVENTION

Figure 1:
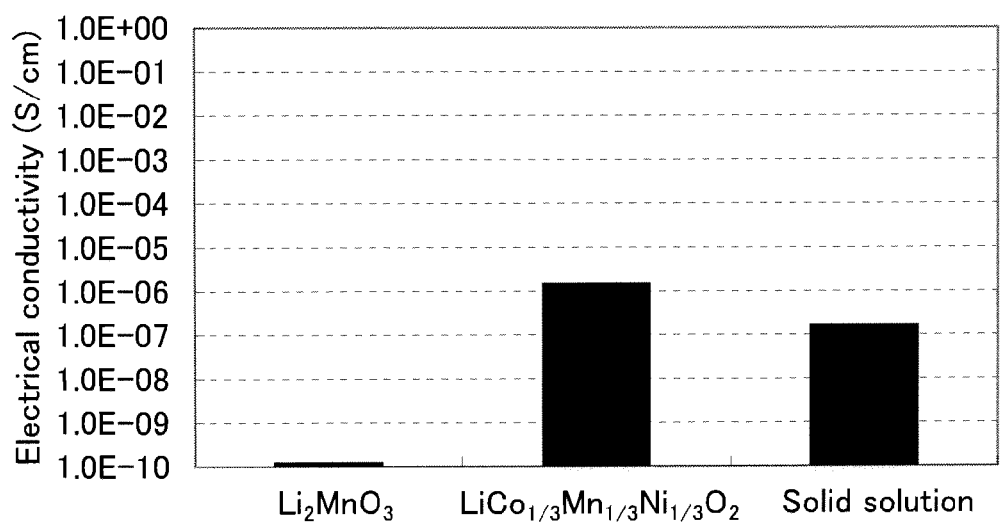
FIG. 1 is a graph of the electrical conductivity of positive electrode materials, according to an embodiment of the present invention.

Hereinafter, an embodiment of the invention will be described with reference to the drawings. Note that the present invention can be carried out in many different modes, and it is to be easily understood by those skilled in the art that the mode and details of the present invention can be variously changed without departing from its spirit and scope. Therefore, the present invention is not construed as being limited to description of the embodiment mode and embodiments. Note that, in the drawings hereinafter shown, the same portions or portions having similar functions are denoted by the same reference numerals, and repeated description thereof will be omitted.

[Embodiment 1]

In this embodiment, a positive electrode active material and a positive electrode including the positive electrode active material, which are embodiments of the present invention, will be described.

The positive electrode active material described in this embodiment is formed using a solid solution including first alkali metal oxide and second alkali metal oxide.

A high-resistance material, i.e., a material with low electrical conductivity is used as the first alkali metal oxide. As the second alkali metal oxide, a material whose resistance is lower than the first alkali metal oxide, i.e., a material with high electrical conductivity is used.

For example, as the first alkali metal oxide, a material having electrical conductivity less than or equal to $10^{-10}$ S/cm, such as $Li_2MnO_3$, $LiMnPO_4$, $Li_2MnSiO_4$, or $Li_2FeSiO_4$ is used. Further, it is preferable to use a material including alkali metal with a valence of 2 or more because alkali metal is more likely to be ionized as the amount of alkali metal included in a positive electrode material is increased.

As the second alkali metal oxide, for example, a material having electrical conductivity greater than or equal to $1\times10^{-6}$ S/cm and less than or equal to $3\times10^{-6}$ S/cm, such as $LiCo_{1/3}Mn_{1/3}Ni_{1/3}O_2$ (also represented as $LiCoMnNiO_4$), $LiFePO_4$, $LiCoO_2$, $LiMn_2O_4$, or $LiNiO_2$, is preferably used. Note that in the first alkali metal oxide and the second alkali metal oxide, Li may be replaced with different alkali metal such as sodium, and Mn or Fe may be replaced with different transition metal.

A solid solution is formed using the first alkali metal oxide and the second alkali metal oxide. The solid solution including the first alkali metal oxide and the second alkali metal oxide has higher electrical conductivity than the first alkali metal oxide. Note that depending on materials, the electrical conductivity of the solid solution is greater than or equal to $1\times10^{-7}$ S/cm and less than or equal to $10\times10^{-7}$ S/cm. This is because the electrical conductivity of the solid solution is affected by properties of the second alkali metal oxide.

When the solid solution is used for a lithium ion battery, the capacity of the battery is largely increased as compared to that in the case where either the first alkali metal oxide or the second alkali metal oxide is singly used for a positive electrode.

From the above phenomenon, it can be found that there is a close relationship between electrical conductivity and capacity, and that when the solid solution is formed using a combination of the first lithium metal oxide with low electrical conductivity and the second lithium metal oxide with high electrical conductivity, electricity easily flows in the solid solution and lithium is easily ionized. As a result, when the solid solution is used as the positive electrode active material, the amount of ions capable of entering and leaving the positive electrode active material is increased, and the capacity of the battery can be increased.

In addition, according to an embodiment of the present invention, lithium metal oxide, which could not be used as a positive electrode material because lithium is contained therein but is less likely to be ionized, can be used as a positive electrode material. Accordingly, a lithium ion battery can be manufactured using lithium metal oxide, which is excellent in terms of safety and cost but could not be used.

[Example 1]

In this example, a positive electrode active material and a positive electrode including the positive electrode active material, which are embodiments of the present invention, will be described with reference to FIG. 1 and FIG. 2.

A positive electrode active material described in this example is formed using a solid solution including lithium metal oxide with low electrical conductivity and lithium metal oxide with high electrical conductivity.

In this example, the solid solution was formed using $Li_2MnO_3$ including lithium with a valence of 2 as the lithium metal oxide with low electrical conductivity and $LiCo_{1/3}Mn_{1/3}Ni_{1/3}O_2$ ($LiCoMnNiO_4$) as the lithium metal oxide with high electrical conductivity.

To form the solid solution, first, a mixture of positive electrode materials is formed. In this example, $Li_2CO_3$, $Co_3O_4$, $MnO_2$, and NiO were used as positive electrode materials. These positive electrode materials are subjected to bail-mill treatment, whereby a mixture of positive electrode materials can be obtained.

Note that the ball-mill treatment was performed in this example under the following conditions: acetone was used as an organic solvent; the rotation rate was 400 rpm; the rotation time was two hours; and the diameter of a ball was φ3 mm. However, an embodiment is not limited to this method as long as solid-phase reaction of the positive electrode materials is promoted and the mixture of positive electrode materials which are uniformly fined can be obtained.

In addition, in order to promote reaction of the mixture of positive electrode materials by improving contact between the materials, pressure is applied to the mixture of positive electrode materials so that the mixture of positive electrode materials is shaped into a pellet, and then firing is performed thereon. The firing may be performed at a temperature higher than or equal to 600° C. and lower than or equal to 1100° C., preferably higher than or equal to 900° C. and lower than or equal to 1000° C., for greater than or equal to one hour and less than or equal to eight hours, preferably approximately five hours. In this example, the pellet was formed with a pressure of 14.7 MPa and the firing was performed in an air atmosphere at 950° C. for five hours.

Through the steps, $Li_2MnO_3$—$LiCo_{1/3}Mn_{1/3}Ni_{1/3}O_2$ which is a solid solution having a layered structure can be obtained.

The above-described solid solution is mixed with a conductive agent, a binder, or the like and processed into a paste and the paste is applied onto a collector and dried, so that a positive electrode precursor is formed. Note that titanium, aluminum, or the like can be used for the collector. Pressure is applied to the positive electrode precursor and the positive electrode precursor is shaped as needed, whereby a positive electrode is manufactured.

Note that as the conductive agent, an electron-conductive material which does not cause chemical change in the power storage device may be used. For example, a carbon material such as graphite or carbon fibers, a metal material such as copper, nickel, aluminum, or silver, or a powder or a fiber of a mixture thereof can be used.

Note that as the binder, a polysaccharide, a thermoplastic resin, a polymer with rubber elasticity, and the like can be given. For example, starch, carboxymethyl cellulose, hydroxypropylcellulose, regenerated cellulose, diacetylcellulose, poly vinyl chloride, polyvinylpyrrolidone, polytetrafluoroethylene, polyvinylidene fluoride, polyethylene, polypropylene, ethylene-propylene-diene monomer (EPDM), sulfonated EPDM, styrene-butadiene rubber, butadiene rubber, fluorine rubber, or the like can be used. In addition, polyvinyl alcohol, polyethylene oxide, or the like may be used.

Alternatively, the positive electrode can be formed using a sputtering method. In the case of using a sputtering method, the positive electrode can be formed in such a manner that a sputtering target is formed by sintering the positive electrode precursor and the sputtering target is introduced into a sputtering apparatus.

In this case, a rare gas such as an argon gas may be used in the sputtering; alternatively, a nitrogen gas may be used. Further alternatively, a rare gas such as an argon gas and a nitrogen gas may be used in combination.

According to the above steps, the positive electrode active material and the positive electrode including the positive electrode active material can be manufactured.

FIG. 1 is a graph of electrical conductivity of each of the lithium metal oxide $Li_2MnO_3$, the lithium metal oxide $LiCo_{1/3}Mn_{1/3}Ni_{1/3}O_2$, and the solid solution $Li_2MnO_3$—$LiCo_{1/3}Mn_{1/3}Ni_{1/3}O_2$. Note that the electrical conductivity was measured at room temperature while applying a pressure of 9.8 MPa after positive electrode precursors of the three materials were formed. The electrical conductivity of $Li_2MnO_3$ was less than or equal to $10^{-10}$ S/cm, which was less than or equal to the measurement limit; the electrical conductivity of $LiCo_{1/3}Mn_{1/3}Ni_{1/3}O_2$ was $1.45 \times 10^{-6}$ S/cm; and the electrical conductivity of the solid solution was $1.58 \times 10^{-7}$ S/cm. It can be found that the electrical conductivity of the solid solution is affected by $LiCo_{1/3}Mn_{1/3}Ni_{1/3}O_2$.

Figure 2:
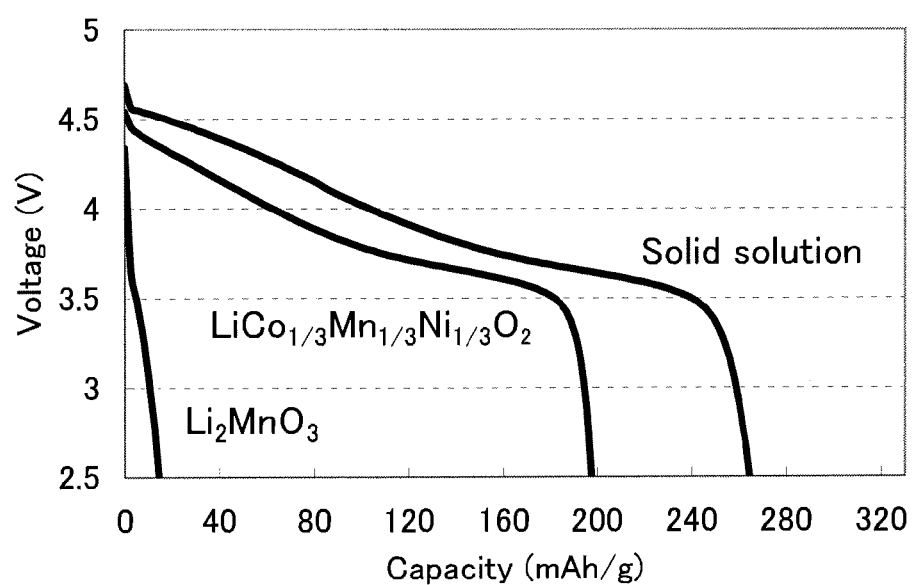
FIG. 2 is a graph of voltage-capacity in a battery using a positive electrode of an embodiment of the present invention.

FIG. 2 is a graph showing a relation between voltage and capacity when each of the above-described three materials is used for a positive electrode of a lithium ion battery. FIG. 2 shows the values of the capacities in the case of using $Li_2MnO_3$, $LiCo_{1/3}Mn_{1/3}Ni_{1/3}O_2$, and the solid solution $Li_2MnO_3$—$LiCo_{1/3}Mn_{1/3}Ni_{1/3}O_2$, from the left side.

The electrical conductivity of the lithium metal oxide $Li_2MnO_3$ is extremely low, and even when the lithium metal oxide $Li_2MnO_3$ is used as a positive electrode of a lithium ion battery, current does not flow and lithium cannot be utilized as a lithium ion, and therefore, the capacity is small. In addition, when the lithium metal oxide $LiCo_{1/3}Mn_{1/3}Ni_{1/3}O_2$, which has high electrical conductivity, is used, the capacity is somewhat large; however, since the valence of lithium is 1, any further increase of the capacity cannot be expected.

The solid solution $Li_2MnO_3$—$LiCo_{1/3}Mn_{1/3}Ni_{1/3}O_2$ has high electrical conductivity, which is affected by properties of the lithium metal oxide $LiCo_{1/3}Mn_{1/3}Ni_{1/3}O_2$. Therefore, current easily flows in the solid solution and lithium can be utilized as a lithium ion. The capacity can be further increased in the case where the lithium metal oxide $Li_2MnO_3$ including lithium with a valence of 2 is used for a positive electrode as compared to that in the case of using only the lithium metal oxide $LiCo_{1/3}Mn_{1/3}Ni_{1/3}O_2$ including lithium with a valence of 1 for a positive electrode because the lithium content in $Li_2MnO_3$ is larger than that in $LiCo_{1/3}Mn_{1/3}Ni_{1/3}O_2$ when both have the same number of moles.

With the use of the positive electrode active material and the positive electrode including the positive electrode active material which are described in this example, a power storage device with large capacity can be obtained.

[Example 2]

In this example, a battery which is an embodiment of the present invention and a manufacturing method thereof will be described. As a positive electrode of the battery, the positive electrode described in Embodiment 1 and Example 1 is used.

Figure 3:
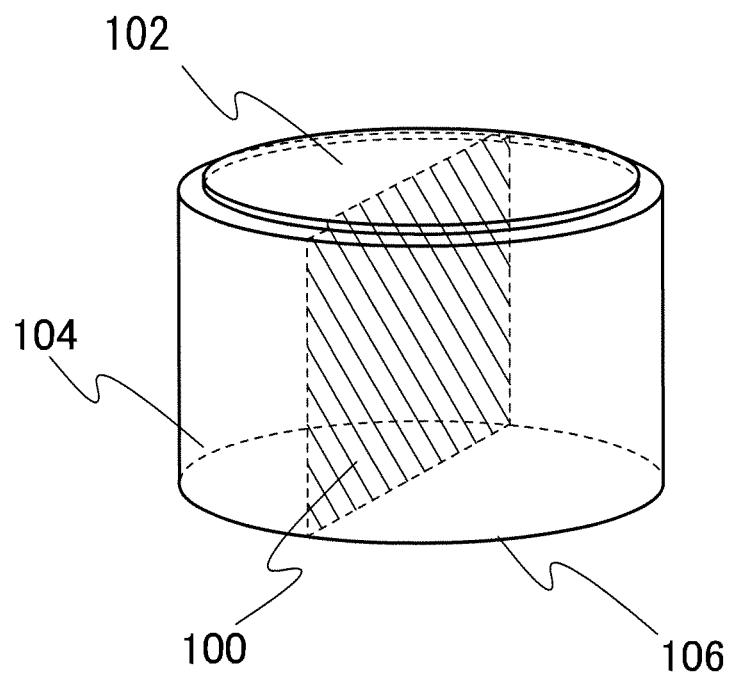
FIG. 3 illustrates an example of a battery which is an embodiment of the present invention.

FIG. 3 is a perspective view illustrating an example of a cylindrical storage battery according to one embodiment of the present invention. Note that an embodiment of the present invention is not limited thereto and may be a square power storage device.

The cylindrical storage battery in FIG. 3 has a closed space surrounded by a battery sidewall 104, a battery cover 102, and a battery bottom 106.

Figure 4:
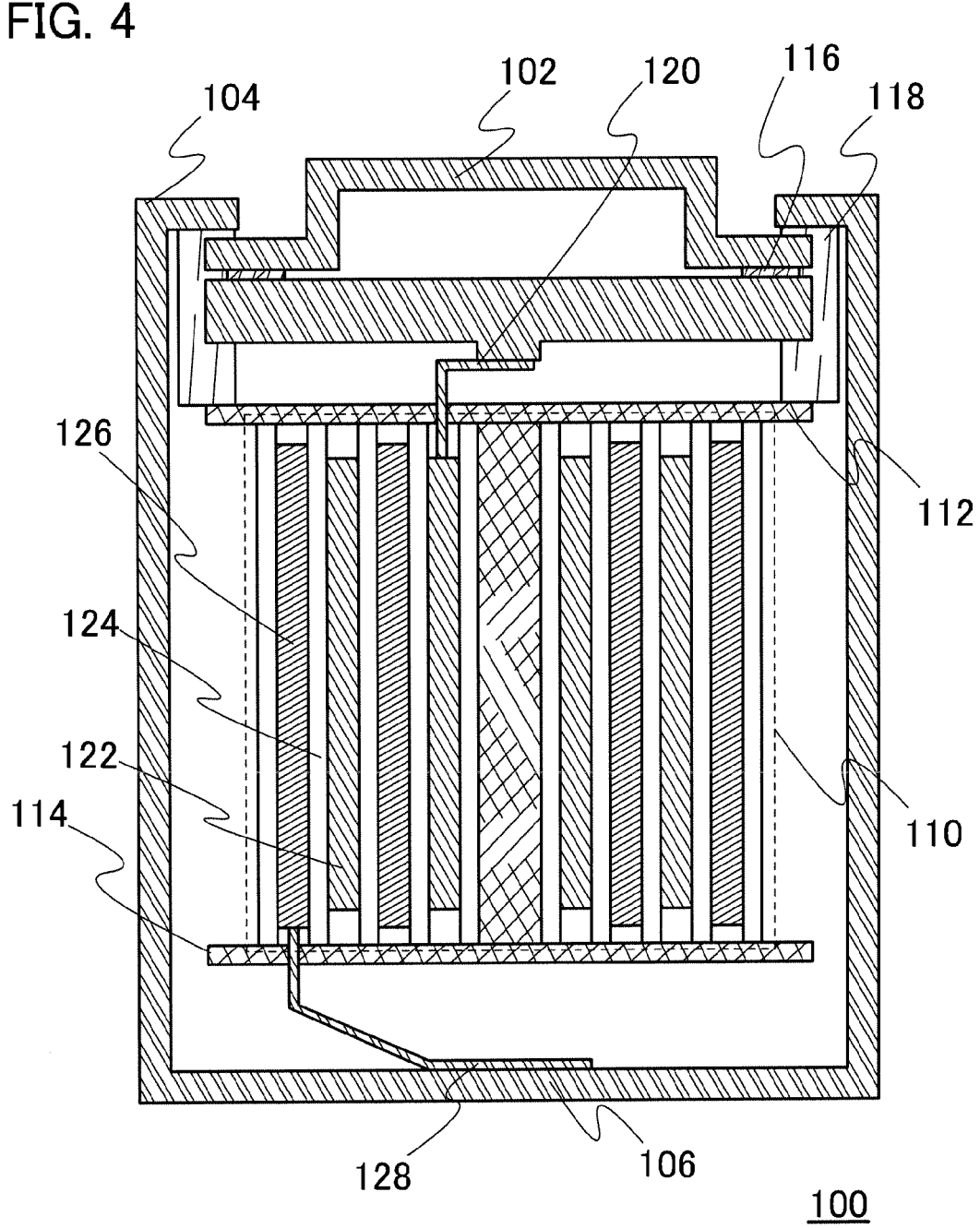
FIG. 4 illustrates an example of a cross section of a battery which is an embodiment of the present invention.

FIG. 4 is a cross-sectional view taken along a cross section 100 of the cylindrical storage battery in FIG. 3.

The battery sidewall 104 and the battery bottom 106 may be formed using a conductive material and an appropriate material may be selected so that the battery sidewall 104 and the battery bottom 106 have appropriate mechanical strength and chemical resistance under the usage environment. For example, an aluminum alloy can be used. The closed space is provided inside the battery surrounded by the battery sidewall 104, the battery bottom 106, and the battery cover 102. An electrode body 110 is placed in the closed space, for example.

The electrode body 110 is sandwiched between an insulating plate 112 on an upper portion (the battery cover 102 side) and an insulating plate 114 on a lower portion (the battery bottom 106 side). A conductive wiring 120 and a conductive wiring 128 are drawn out from the insulating plate 112 and the insulating plate 114, respectively. The conductive wiring 120 drawn out from the insulating plate 112 of the upper portion (the battery cover 102 side) is preferably connected to the battery cover 102 through a resistor 116. As the resistor 116, a heat sensitive resistor whose resistance increases as a temperature rises is preferably used. This is for prevention of abnormal heat generation due to excessive current flow. The conductive wiring 128 drawn out from the insulating plate 114 of the lower portion (the battery bottom 106 side) is connected to the battery bottom 106. Note that the battery bottom 106 and the battery sidewall 104 are electrically connected to each other.

The battery sidewall 104, the battery cover 102, and the insulating plate 112 of the upper portion (the battery cover 102 side) are preferably connected to each other through a gasket 118. The gasket 118 preferably has an insulating property; however, there is no limitation thereto and at least the battery cover 102 and the battery sidewall 104 should be insulated from each other.

Although not illustrated, a structure may be employed in which a safety valve is provided inside the battery so that the connection between the battery cover 102 and the electrode body 110 is cut off in the case where a negative electrode 126 and a positive electrode 122 are short-circuited or the battery is heated and the pressure in the battery increases.

Further, a center pin may be inserted in the center of the electrode body 110 in order to fix a position of the electrode body 110.

The electrode body 110 includes the negative electrode 126, the positive electrode 122, and a separator 124 provided therebetween. The positive electrode 122 of the electrode body 110 is electrically connected to the battery cover 102 through the conductive wiring 120. The negative electrode 126 of the electrode body 110 is electrically connected to the battery bottom 106 through the conductive wiring 128.

The negative electrode 126 is preferably formed using a collector and an active material. For example, graphite or silicon serving as a negative electrode active material may be formed over a negative electrode collector.

A negative electrode active material layer may be formed by mixing the negative electrode active material with a conductive agent, a binder, or the like and processed into a paste which is then applied onto a collector. Alternatively, the negative electrode active material layer may be formed by a sputtering method. Pressing may be also performed on the negative electrode active material layer as needed.

Note that titanium, copper, or the like can be used for the collector.

Note that as the separator 124, paper, nonwoven fabric, a glass fiber, a synthetic fiber such as nylon (polyamide), vinylon (also called vinalon) (a polyvinyl alcohol based fiber), polyester, acrylic, polyolefin, or polyurethane, or the like can be used. Note that a material which does not dissolve in an electrolyte solution should be selected.

As the electrolyte solution in which the separator 124 is soaked, for example, a mixture in which lithium hexafluorophosphate ($LiPF_6$) is added to a mixed solution of ethylene carbonate (EC) and diethyl carbonate (DEC) may be used. Further, as the electrolyte, lithium chloride (LiCl), lithium fluoride (LiF), lithium perchlorate ($LiClO_4$), lithium fluoroborate ($LiBF_4$), lithium bis(trifluoromethanesulfonyl)imide ($LiN(SO_2CF_3)_2$), lithium bis(pentafluoroethanesulfonyl)imide ($LiN(SO_2C_2F_5)_2$), lithium trifluoromethansulfonate ($LiCF_3SO_3$), or the like can be used. Furthermore, in the case where an alkali metal ion other than a lithium ion is used, sodium chloride (NaCl), sodium fluoride (NaF), sodium perchlorate ($NaClO_4$), sodium fluoroborate (NaBF$_4$), potassium chloride (KCl), potassium fluoride (KF), potassium perchlorate (KClO$_4$), potassium fluoroborate (KBF$_4$), or the like can be used, one or more of which may be dissolved in a solvent.

Note that examples of the solvent includes: cyclic carbonates such as propylene carbonate (PC), butylene carbonate (BC), and vinylene carbonate (VC); acyclic carbonates such as dimethyl carbonate (DMC), ethylmethyl carbonate (hereinafter abbreviated as EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane; alkyl phosphate esters such as trimethyl phosphate, triethyl phosphate, and trioctyl phosphate and fluorides thereof. These materials can be used either alone or in combination.

Note that the case where a lithium ion is mainly included in the electrolyte solution is described in this example; however, there is no limitation thereto and another alkali metal ion may be used.

As described above, a battery can be manufactured using the electrode described in Embodiment 1 as the positive electrode.

With the structure described in this example, a power storage device having large capacity can be obtained.

This application is based on Japanese Patent Application serial no. 2010-064427 filed with Japan Patent Office on Mar. 19, 2010, the entire contents of which are hereby incorporated by reference.

The invention claimed is:

1. A power storage device comprising:
a positive electrode comprising a solid solution,
wherein the solid solution comprises a first alkali metal oxide and a second alkali metal oxide,
wherein the solid solution has an electrical conductivity greater than or equal to $1 \times 10^{-7}$ S/cm and less than or equal to $10 \times 10^{-7}$ S/cm,
wherein the first alkali metal oxide is Li$_2$MnO$_3$,
wherein the second alkali metal oxide is LiCo$_{1/3}$Mn$_{1/3}$Ni$_{1/3}$O$_2$, and
wherein the positive electrode is formed by a sputtering method by using a target comprising the solid solution.

2. The power storage device according to claim 1,
wherein the solid solution has a layered structure, and
wherein the solid solution is Li$_2$MnO$_3$—LiCo$_{1/3}$Mn$_{1/3}$Ni$_{1/3}$O$_2$.

3. A power storage device comprising:
a positive electrode comprising a solid solution,
wherein the solid solution comprises a first alkali metal oxide and a second alkali metal oxide,
wherein the solid solution has an electrical conductivity greater than or equal to $1 \times 10^{-7}$ S/cm and less than or equal to $10 \times 10^{-7}$ S/cm,
wherein the first alkali metal oxide is any of Li$_2$MnSiO$_4$ and Li$_2$FeSiO$_4$,
wherein the second alkali metal oxide is any of LiCoO$_2$, LiMn$_2$O$_4$, and LiNiO$_2$, and
wherein the positive electrode is formed by a sputtering method by using a target comprising the solid solution.

4. A power storage device comprising:
a first conductive wiring electrically connected to a battery cover;
a second conductive wiring electrically connected to a battery bottom which is insulated from the battery cover; and
an electrode body provided with an upper insulating plate and a lower insulating plate,
wherein the electrode body comprises:
a positive electrode comprising a solid solution, and electrically connected to the first conductive wiring through the upper insulating plate;
a negative electrode electrically connected to the second conductive wiring through the lower insulating plate; and
a separator provided between the positive electrode and the negative electrode,
wherein the solid solution comprises a first alkali metal oxide and a second alkali metal oxide,
wherein the solid solution has an electrical conductivity greater than or equal to $1 \times 10^{-7}$ S/cm and less than or equal to $10 \times 10^{-7}$ S/cm,
wherein the first alkali metal oxide is any of Li$_2$MnSiO$_4$ and Li$_2$FeSiO$_4$,
wherein the second alkali metal oxide is any of LiCoO$_2$, LiMn$_2$O$_4$, and LiNiO$_2$, and
wherein the positive electrode is formed by a sputtering method by using a target comprising the solid solution.

5. The power storage device according to claim 1, wherein the positive electrode further comprises a conductive agent and a binder.

6. The power storage device according to claim 5, wherein the conductive agent is a graphite of a carbon fiber.

7. The power storage device according to claim 3, wherein the positive electrode further comprises a conductive agent and a binder.

8. The power storage device according to claim 7, wherein the conductive agent is a graphite of a carbon fiber.

9. The power storage device according to claim 4, wherein the positive electrode further comprises a conductive agent and a binder.

10. The power storage device according to claim 9, wherein the conductive agent is a graphite of a carbon fiber.

11. A sputtering target comprising a solid solution and a conductive agent,
wherein the solid solution is Li$_2$MnO$_3$—LiCo$_{1/3}$Mn$_{1/3}$Ni$_{1/3}$O$_2$, and
wherein the solid solution has an electrical conductivity greater than or equal to $1 \times 10^{-7}$ S/cm and less than or equal to $10 \times 10^{-7}$ S/cm.

12. The sputtering target according to claim 11, wherein the conductive agent is a graphite of a carbon fiber.

* * * * *